(12) United States Patent
Tao et al.

(10) Patent No.: US 11,579,023 B2
(45) Date of Patent: Feb. 14, 2023

(54) FLICKER NOISE REDUCTION IN A TEMPERATURE SENSOR ARRANGEMENT

(71) Applicant: EM MICROELECTRONIC MARIN S.A., Marin (CH)

(72) Inventors: Yonghong Tao, Singapore (SG); Pinchas Novac, Neuchatel (CH); Sylvain Grosjean, Les Fins (FR); Alexandre Deschildre, Marin (CH); Hugues Blangy, Payerne (CH)

(73) Assignee: EM MICROELECTRONIC-MARIN S.A., Marin (CH)

(*) Notice: Subject to any disclaimer, the term of this patent is extended or adjusted under 35 U.S.C. 154(b) by 569 days.

(21) Appl. No.: 16/716,864

(22) Filed: Dec. 17, 2019

(65) Prior Publication Data

US 2020/0249096 A1     Aug. 6, 2020

(30) Foreign Application Priority Data

Feb. 4, 2019 (EP) ..................................... 19155312

(51) Int. Cl.
| | |
|---|---|
| *G01K 7/01* | (2006.01) |
| *G05F 3/22* | (2006.01) |
| *G05F 3/02* | (2006.01) |
| *G05F 3/16* | (2006.01) |
| *G05F 3/30* | (2006.01) |

(52) U.S. Cl.
CPC ............... *G01K 7/01* (2013.01); *G05F 3/02* (2013.01); *G05F 3/16* (2013.01); *G05F 3/22* (2013.01); *G05F 3/222* (2013.01); *G05F 3/30* (2013.01)

(58) Field of Classification Search
CPC .. G01K 7/01; G01K 7/015; G05F 3/02; G05F 3/16; G05F 3/22; G05F 3/222; G05F 3/30; G05F 1/46; G05F 1/461
See application file for complete search history.

(56) References Cited

U.S. PATENT DOCUMENTS

| | | | |
|---|---|---|---|
| 8,016,481 B1 | 9/2011 | Avitan | |
| 10,024,729 B2 * | 7/2018 | Singh | ........................ G01K 7/01 |

FOREIGN PATENT DOCUMENTS

| | | |
|---|---|---|
| JP | 10246676 A | 9/1998 |
| JP | 2009257790 A | 11/2009 |

(Continued)

OTHER PUBLICATIONS

Communication dated Nov. 4, 2020, from the Japanese Patent Office in application No. 2019-232531.

(Continued)

*Primary Examiner* — Jung Kim

(74) *Attorney, Agent, or Firm* — Sughrue Mion, PLLC

(57) ABSTRACT

A temperature sensor arrangement (10), including a bandgap voltage generator (12), which is configured to provide an output voltage ($V_{bg}$); at least one semiconductor junction (14) for temperature sensing, which is biased by a biasing current flowing through said semiconductor junction (14); and at least one poly-resistor ($R_{b3}$) which is connected between the output (23) of the bandgap voltage generator (12) and the semiconductor junction (14), thereby providing said biasing current from the bandgap voltage generator (12) to the semiconductor junction (14).

14 Claims, 4 Drawing Sheets

(56) References Cited

FOREIGN PATENT DOCUMENTS

| JP | 2011007545 A | 1/2011 |
|---|---|---|
| JP | 2014098614 A | 5/2014 |
| KR | 10-2017-0114314 A | 10/2017 |

OTHER PUBLICATIONS

Communication dated Jun. 28, 2021 from the Korean Intellectual Property Office in Application No. 10-2020-0005390.
Michiel A. P. Pertijs, et al., "A CMOS Smart Temperature Sensor With a 3σ Inaccuracy of ±0.1° C. From -55° C. to 125° C.", IEEE Journal of Solid-State Circuits, Dec. 12, 2005, pp. 2805-2815, vol. 40, No. 12.
Walter C. Pflanzl, et al., "1/f Noise Temperature Behaviour of Poly Resistors", Mixed Design of Integrated Circuits and Systems, May 24-26, 2015, pp. 297-299.
European Search Report for EP 19 15 5312 dated Jul. 16, 2019.

\* cited by examiner

FLICKER NOISE REDUCTION IN A TEMPERATURE SENSOR ARRANGEMENT

CROSS REFERENCE TO RELATED APPLICATIONS

This application is a non-provisional application, claiming priority based on European Patent Application No. 19155312.2 filed Feb. 4, 2019.

TECHNICAL FIELD

The invention relates to the field of temperature sensing by an electronic sensor. More specifically, the present invention relates to a temperature sensor arrangement comprising a bandgap voltage generator.

BACKGROUND OF THE INVENTION

Temperature sensor circuits are used in some applications to monitor the environment. In some other applications, such sensor circuits can be used to tune parameters of an external circuit in order to compensate its nonidealities upon temperature changes. Generally, such sensor circuits include a semiconductor junction for temperature sensing, which is biased by a biasing current from a current source. The semiconductor junction for temperature sensing usually form a diode, and the resulted voltage of such a diode may be digitized in an analog-to-digital converter (ADC) with a digitized output used for different applications. Such a configuration of a known sensor circuit 1 is shown for example in FIG. 1. A current source $I_b$ is used to bias a bipolar semiconductor junction 2. The bipolar semiconductor junction 2 is for example a diode-connected substrate pnp type transistor. The resulted voltage, $V_{be}$, has complementary to absolute temperature (CTAT) characteristics. This voltage $V_{be}$ is digitized by an ADC 4. A reference voltage generator 6 provides the ADC 4 with a referencing voltage $V_{ref}$ which shall have ignorable temperature dependency. In order to get zero digital output at around 25° C. and/or to directly drive a full differential ADC, it is desirable to subtract an offset voltage, $V_{off}$, from $V_{be}$ during the analog-to-digital conversion. In order to avoid imposing additional error for the temperature sensing, $V_{off}$ must also have ignorable temperature dependency. For this purpose, $V_{off}$ is for example derived from an output voltage $V_{bg}$ of a bandgap voltage generator 8, via a voltage divider network portion. The voltage divider network portion includes for instance two resistors R1, R2.

However, it is to be noted that there is usually a problem in such temperature sensor arrangements, due to a flicker noise that occurs at low frequency in the electronic components. Such low frequency flicker noise in the voltages $V_{be}$, $V_{off}$ and $V_{ref}$ modulates the digital output of the temperature sensor and limits its long-term stability. Moreover, such a flicker noise impairs the accuracy of the temperature measurement result. The flicker noise in the voltages $V_{off}$ and $V_{ref}$ is usually handled by a known solution which consists in having a chopper-stabilized bandgap reference circuit as the bandgap voltage generator 8. However, it would be desirable to reduce the flicker noise in $V_{be}$, and more precisely in the biasing current $I_b$ since the semiconductor junction 2 usually demonstrate low enough flicker noise.

Some known solutions to this problem are based on the use of chopping methods among the transistor devices of the current source that generates $I_b$, and/or on the implementation of a chopper-stabilized operational transconductance amplifier (OTA) in such a source. However, the practical implementation of such solutions is complex. Moreover, when based on a chopper-stabilized OTA, such solutions impose trade-offs among the size of the circuit, the power consumption and the complexity in chopping.

SUMMARY OF THE INVENTION

It is an object of the present invention to provide a temperature sensor arrangement that could reduce flicker noise in the biasing current flowing through the semiconductor junction, and hence achieve greater accuracy for the sensor, while being simple to implement, taking up little space and having low current consumption.

According to the invention, there is provided a temperature sensor arrangement as recited in claim 1.

Due to the feature wherein the arrangement comprises at least one poly-resistor which is connected between the output of the bandgap voltage generator and the semiconductor junction, thereby providing a biasing current from the bandgap voltage generator to the semiconductor junction, the flicker noise at low frequency is greatly reduced in the sensor, which allows an accurate measurement of the temperature. Moreover, the area consumption of the proposed new solution is much lower than that of the conventional biasing current sources, since it only requires at least one poly-resistor. Additionally, the power consumption in the proposed solution is much lower than that of the conventional biasing current sources, since it only requires drawing a current solely consumed by the semiconductor junction. Lastly, the linearity of the sensor is improved, and there are no additional efforts required, since there is no need to implement chopping in the biasing current generator for flicker noise reduction. This is due to the fact that the adopted poly-resistor itself has a property of low flicker noise.

Other aspects of the invention are recited in the dependent claims attached hereto.

According to an embodiment of the temperature sensor arrangement, the bandgap voltage generator comprises a chopper amplifier.

Advantageously, the bandgap voltage generator further comprises a source follower output stage connected to the output of the chopper amplifier, the poly-resistor or each poly-resistor being connected to the output of the source follower output stage. Such a source follower output stage allows increasing the stability of the bandgap voltage generator. Furthermore, it allows decreasing the output resistance value for the bandgap voltage generator, thereby facilitating the implementation of the present solution.

According to an embodiment of the temperature sensor arrangement, the arrangement further comprises an analog-to-digital converter connected to a node between said poly-resistor and said semiconductor junction for providing a digitized output of the temperature measurement. In this way, a digitized output can be obtained for the temperature sensor arrangement, which can be useful for different applications, such as applications using a microprocessor for example.

Advantageously, the analog-to-digital converter is a differential analog-to-digital converter which has a reference terminal connected to a node of a voltage divider network portion, said voltage divider network portion being connected between the output of the bandgap voltage generator and a first input of the differential analog-to-digital converter and providing a reference voltage to said converter. This allows using the output voltage of the bandgap voltage generator as the reference voltage for the differential analog-to-digital converter, thereby enabling mutualization of some components and a further gain in area and power consumption.

BRIEF DESCRIPTION OF THE DRAWINGS

Other features and advantages of the temperature sensor arrangement will appear more clearly in the following description of non-limiting embodiments, with reference to the appended drawings, in which.

DETAILED DESCRIPTION

In the following description, all the components of the temperature sensor arrangement that are well known to those skilled in the art in this technical field will be described only in a simplified manner.

Figure 2:
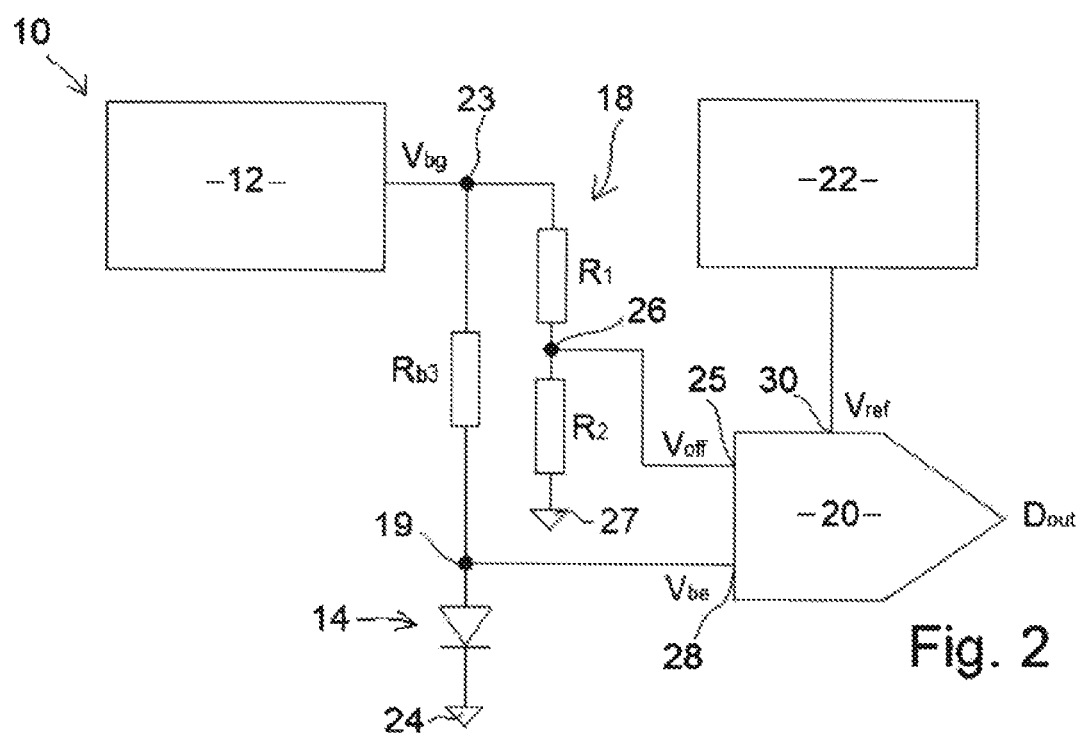
FIG. 2 schematically shows a first embodiment of the temperature sensor arrangement according to the invention.

In FIG. 2 is illustrated a first embodiment of a temperature sensor arrangement 10 according to the invention. The temperature sensor arrangement 10 can be used for different applications including, but not limited to, tuning parameters of an external circuit in order to compensate its nonidealities upon temperature changes. Such an external circuit can be for example a microelectromechanical system (MEMS), such as a pressure sensor or a humidity sensor for instance, that need high accuracy temperature sensors with very low noise. The temperature sensor arrangement 10 can also be used for internal test or calibration during production. The temperature sensor arrangement 10 comprises a bandgap voltage generator 12, a semiconductor junction 14 for temperature sensing, and a poly-resistor $R_{b3}$. The temperature sensor arrangement 10 further can comprise a voltage divider network portion 18, a differential analog-to-digital converter (ADC) 20, and a reference voltage generator 22.

The bandgap voltage generator 12 is configured to provide on its output 23 an output voltage $V_{bg}$. The output voltage $V_{bg}$ can be a bandgap reference voltage, the value of which is typically in the range of 1.16 V to 1.25 V at around 25° C. degree. The bandgap voltage generator 12 may be a chopper-stabilized bandgap voltage generator.

As shown in FIG. 2, the poly-resistor $R_{b3}$ is connected between the output 23 of the bandgap voltage generator 12 and the semiconductor junction 14, thereby providing to the junction 14 a biasing current which flows through the junction 14. The poly-resistor $R_{b3}$ is connected to the semiconductor junction 14 at a node 19. The poly-resistor $R_{b3}$ is for example an implanted polysilicon resistor. In this latter case, the polysilicon resistor may have a resistance value ranging typically from 20 kΩ to 25 kΩ. Alternatively, the poly-resistor $R_{b3}$ may be a p+ type implanted poly-resistor, or a diffused poly-resistor, or any type of polysilicon resistor having low flicker noise.

The semiconductor junction 14 has a voltage at its terminals whose value depends on the temperature. In the particular embodiment illustrated on FIG. 2, the junction 14 is for example a bipolar junction transistor device, typically a diode-connected substrate pnp type transistor. In this case, said voltage is the base-emitter voltage $V_{be}$ of the transistor device. The base-emitter voltage $V_{be}$ has complementary to absolute temperature (CTAT) characteristics. Hence, the biasing current flowing through the poly-resistor $R_{b3}$ is in a proportional to absolute temperature (PTAT) style inherently. Such a PTAT biasing current is favored by the semiconductor junction 14, since the non-linearity in the transfer function of voltage $V_{be}$ versus temperature shall be smaller, as compared with the case if a temperature independent biasing current is used. The $V_{be}$ voltage value is typically about 0.7 V at around 25° C. Alternatively, the junction 14 may be a bipolar junction forming a diode, for example a diode implanted on the same or on a separate chip than that on which the other components of the sensor arrangement 10 are implanted.

The semiconductor junction 14 is biased by the biasing current provided by the poly-resistor $R_{b3}$. One of the electrodes of the junction 14 is connected to a supply terminal 24, said supply terminal 24 being for example connected to earth.

The voltage divider network portion 18 is connected between the output 23 of the bandgap voltage generator 12 and a first input 25 of the differential ADC 20. More precisely, the voltage divider network portion 18 comprises two resistors R1, R2 which are connected in series at a node 26. The first input 25 of the differential ADC 20, which is typically the non-inverting input of the ADC 20, is connected to the node 26. The node 26 thus provides an offset voltage $V_{off}$ to the first input 25 of the differential ADC 20. A first resistor $R_1$ is connected to the output 23 of the bandgap voltage generator 12, the second resistor R2 being connected to a supply terminal 27, said supply terminal 27 being for example connected to earth.

The differential ADC 20 is connected to the nodes 19, 26 and provides a digitized output $D_{out}$ of the temperature measurement. More precisely, a second input 28 of the ADC 20, which is typically the inverting input of the ADC 20, is connected to the node 19 between the poly-resistor $R_{b3}$ and the semiconductor junction 14.

The differential ADC 20 is for example a multichannel sensor ADC, typically a high resolution ADC, whose output can be connected to a microprocessor for different applications. The digitized output $D_{out}$ provided by the ADC 20 may be for example a 16 bits or a 18 bits digitized output.

The reference voltage generator 22 is connected to a reference terminal 30 of the differential ADC 20. The reference voltage generator 22 is configured to provide a reference voltage $V_{ref}$ to the differential ADC 20, the latter being then biased by the reference voltage $V_{ref}$. The reference voltage generator 22 may be a bandgap voltage generator. The reference voltage $V_{ref}$ is a voltage which is not influenced by temperature. The $V_{ref}$ voltage value is typically about 0.7 V.

With such a configuration, the ADC digitized output $D_{out}$ can be expressed as following:

$$D_{out} = (V_{be} - (R2/(R1+R2)) \cdot V_{bg}) \cdot 2^N / V_{ref},\text{ where } N \text{ is the ADC resolution.}$$

Figure 3:
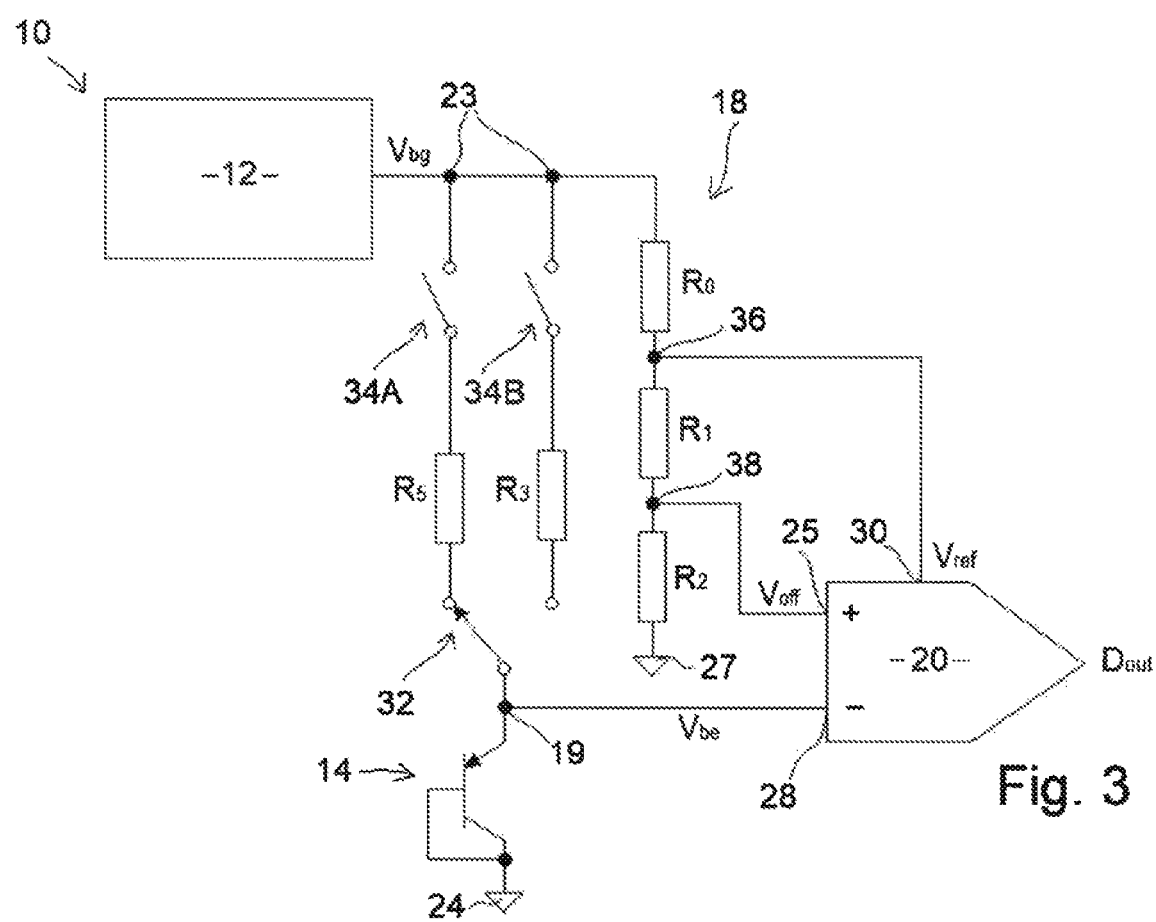
FIG. 3 schematically shows a second embodiment of the temperature sensor arrangement according to the invention.

In FIG. 3 is illustrated a second embodiment of the temperature sensor arrangement 10. Functional and structural elements which appear in FIG. 3 and which are identical or similar to those of the sensor arrangement according to the first embodiment are assigned the same reference numerals and won't be described in further details hereinafter.

The temperature sensor arrangement 10 comprises two poly-resistors $R_3$, $R_5$. The two resistors $R_3$, $R_5$, which have distinct resistance values, are arranged to be connected selectively through a respective switch 32 to the semiconductor junction 14, and connected to the output 23 of the bandgap voltage generator 12. Preferably, the arrangement 10 may comprise additional switches 34A, 34B, each of said switches 34A, 34B being connected between the output 23 of the bandgap voltage generator 12 and one of the poly-resistors $R_3$, $R_5$.

In the particular embodiment illustrated on FIG. 3, the semiconductor junction 14 is for example a bipolar junction transistor device, typically a diode-connected substrate pnp type transistor.

The voltage divider network portion 18 comprises three resistors $R_0$, $R_1$, $R_2$ which are connected in series. The resistors $R_0$ and $R_1$ are connected in series at a first node 36. The resistors $R_1$ and $R_2$ are connected in series at a second node 38. The first input 25 of the differential ADC 20, which is typically the non-inverting input of the ADC 20, is connected to the second node 38.

In this second embodiment, the temperature sensor arrangement 10 does not comprise any reference voltage generator. Instead, the reference terminal 30 of the differential ADC 20 is connected to the first node 36 of the voltage divider network portion 18. The voltage divider network portion 18 thereby provides the reference voltage $V_{ref}$ to the differential ADC 20, said reference voltage $V_{ref}$ being a fraction of the output voltage $V_{bg}$. In an alternative embodiment which is not shown on the drawings, the reference voltage $V_{ref}$ may be the output voltage $V_{bg}$.

This second embodiment of the temperature sensor arrangement 10 allows overcoming the variability of the semiconductor junction 14.

Figure 4:
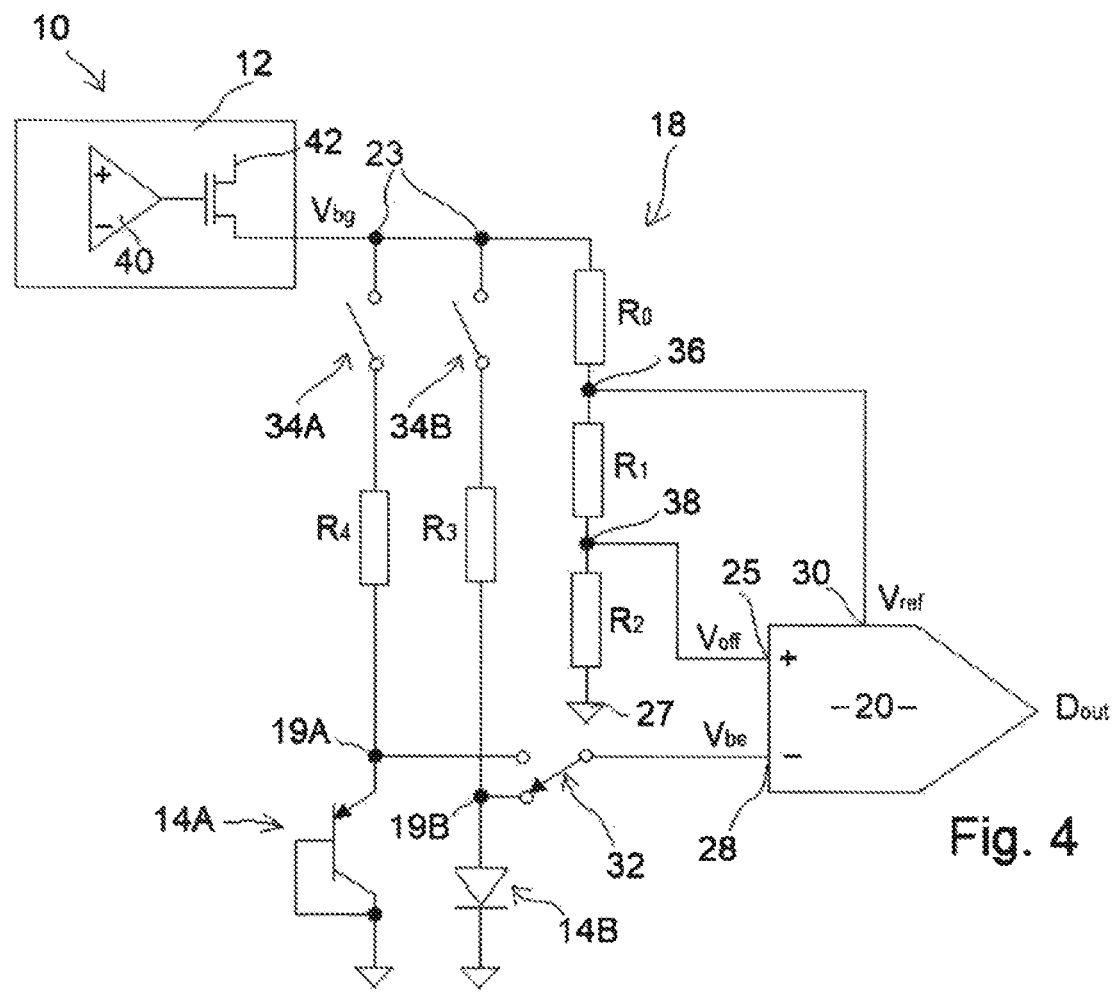
FIG. 4 schematically shows a third embodiment of the temperature sensor arrangement according to the invention.

In FIG. 4 is illustrated a third embodiment of the temperature sensor arrangement 10. Functional and structural elements which appear in FIG. 4 and which are identical or similar to those of the sensor arrangements according to the first and second embodiments are assigned the same reference numerals and won't be described in further details hereinafter.

The temperature sensor arrangement 10 comprises two semiconductor junctions 14A, 14B, two corresponding poly-resistors $R_3$, $R_4$, and means 34A, 34B for selectively switching between a connection and a non-connection between each of the semiconductor junctions 14A, 14B and the bandgap voltage generator 12 through one of the poly-resistors $R_3$, $R_4$. The switching means 34A, 34B comprise for example two switches 34A, 34B, each switch 34A, 34B being connected between the output 23 of the bandgap voltage generator 12 and one of the poly-resistors $R_3$, $R_4$. Each poly-resistor $R_3$, $R_4$ is connected between a respective one of the switches 34A, 34B and one of the semiconductor junctions 14A, 14B.

The switch 32 allows to connect selectively the inverting input 28 of the ADC 20 either to a node 19A of a first circuit branch comprising a first semiconductor junction 14A and a first poly-resistor $R_4$, or to a node 19B of a second circuit branch comprising a second semiconductor junction 14B and a second poly-resistor $R_3$.

In the particular embodiment illustrated on FIG. 4, the bandgap voltage generator 12 comprises a chopper amplifier 40, and a source follower output stage 42 connected to the output of the chopper amplifier 40. As shown in FIG. 4, the source follower output stage 42 is for example a transistor device, typically a Metal Oxide Semiconductor Field Effect Transistor (MOSFET), which biases the resistors $R_0$, $R_1$, $R_2$ of the voltage divider network portion 18, and the poly-resistors $R_3$, $R_4$. The poly-resistors $R_3$, $R_4$ are each connected, via the switches 34A, 34B, to the output 23 of the source follower output stage 42. In an alternative embodiment which is not shown on the drawings, the poly-resistors $R_3$, $R_4$ are each connected, via the switches 34A, 34B, to the output of the chopper amplifier 40.

A first semiconductor junction 14A is for example a bipolar junction transistor device, typically a diode-connected substrate pnp type transistor. A second semiconductor junction 14B is for example a diode. Preferably, the temperature sensor arrangement 10 comprises a chip, and the bandgap voltage generator 12, both of the poly-resistors $R_3$, $R_4$, the switching means 32, 34A, 34B and the bipolar junction transistor device 14A are implanted on the chip. The diode 14B is implanted on another separate chip. This other separate chip may be the chip of a MEMS sensor to be temperature compensated, such as a pressure sensor or a humidity sensor for instance. In this third embodiment of the temperature sensor arrangement 10, the poly-resistors $R_3$, $R_4$ are used either to bias the diode 14B close to the MEMS sensor to be temperature compensated, or to bias the bipolar junction transistor device 14A for test or other temperature sensing applications. The selection of the semiconductor junction 14A, 14B to be biased may be done for example thanks to a register bit.

Figure 1:
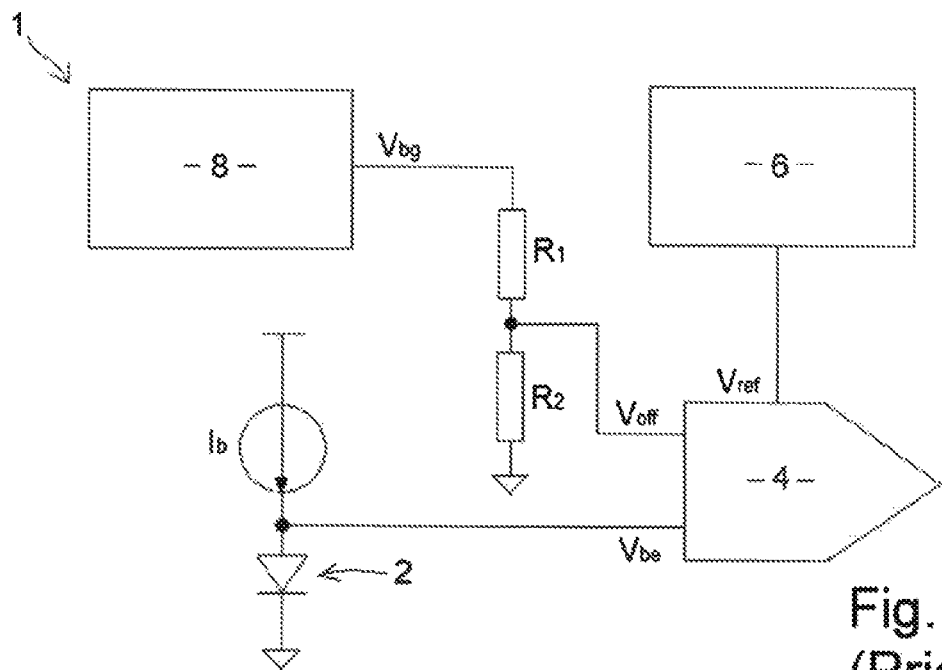
FIG. 1 schematically shows a temperature sensor arrangement according to the prior art.
Figure 5:
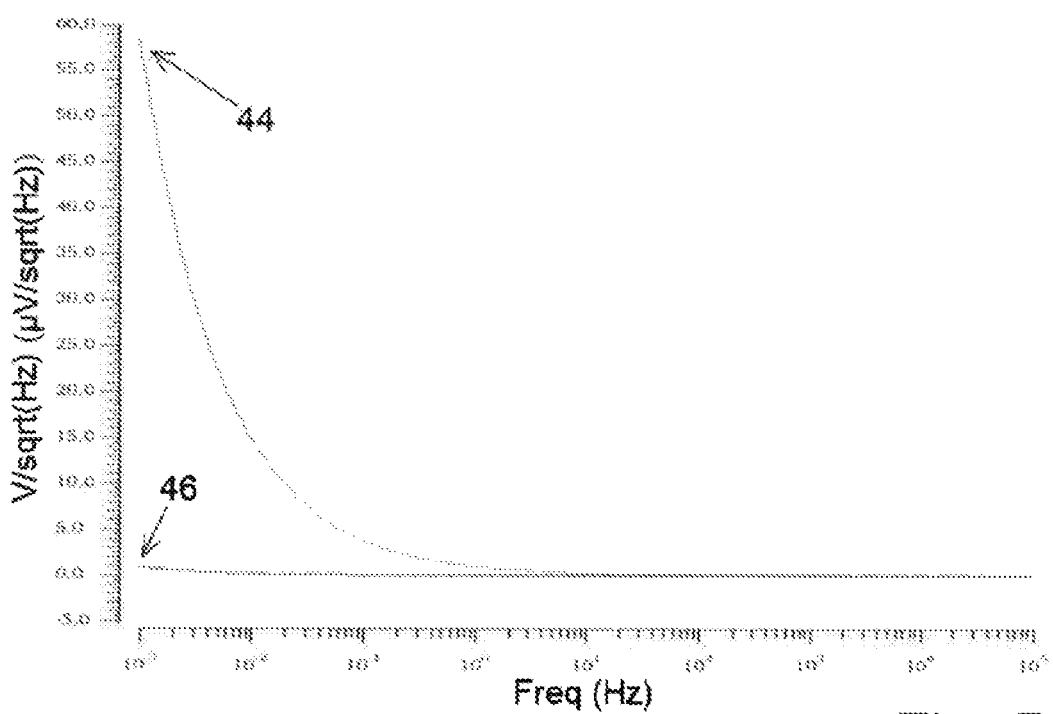
FIG. 5 is a diagram comparing the output flicker noise in the prior art temperature sensor arrangement of FIG. 1 and the output flicker noise in the temperature sensor arrangement of FIG. 2.

FIG. 5 is a diagram comparing the output flicker noise in the prior art temperature sensor arrangement 1 of FIG. 1 (when the flicker noise in $I_b$ is not purposely reduced) and the output flicker noise in the temperature sensor arrangement 10 of FIG. 2. A first curve 44 shows the evolution of the intensity of the flicker noise in the prior art temperature sensor arrangement 1, as a function of the frequency. A second curve 46 shows the evolution of the intensity of the flicker noise in the temperature sensor arrangement 10 according to the invention, as a function of the frequency. It clearly appears that thanks to the temperature sensor arrangement 10 according to the invention, there is a significant reduction of the flicker noise. For example, at a frequency of 1 mHz, the intensity of the flicker noise is of 58 μV/sqrt(Hz) in the prior art temperature sensor arrangement 1, whereas it is only of 1 μV/sqrt(Hz) in the temperature sensor arrangement 10 according to the invention.

In the claims, the word "comprising" does not exclude other elements or steps, and the indefinite article "a" or "an" does not exclude a plurality. The mere fact that different features are recited in mutually different dependent claims or in different embodiments does not indicate that a combination of these features cannot be advantageously used. Any reference signs in the claims should not be construed as limiting the scope of the invention.

The invention claimed is:

1. A temperature sensor arrangement comprising:
   a bandgap voltage generator, which is configured to provide an output voltage ($V_{bg}$);
   at least one semiconductor junction for temperature sensing, which is biased by a biasing current flowing through said semiconductor junction
   wherein the arrangement further comprises at least one poly-resistor which is connected between the output of the bandgap voltage generator and the semiconductor junction, thereby providing said biasing current from the bandgap voltage generator to the semiconductor junction, wherein the arrangement further comprises an analog-to-digital converter connected to a node between said poly-resistor and said semiconductor junction for providing a digitized output (Dout) of the temperature measurement, wherein the analog-to-digital converter is a differential analog-to-digital converter, a first input of said converter being connected to the output of the bandgap voltage generator through at least one intermediate element, a second input of said converter being connected to said node, and wherein the arrangement further comprises a voltage divider network portion, said portion being connected between the output of the bandgap voltage generator and said first input of the differential analog-to-digital converter.

2. The temperature sensor arrangement according to claim 1, wherein the or at least one of the semiconductor junctions a bipolar junction transistor device.

3. The temperature sensor arrangement according to claim 1, wherein the or at least one of the semiconductor junctions is a bipolar junction forming a diode.

4. The temperature sensor arrangement according to claim 1, wherein the or at least one of the poly-resistors is an implanted polysilicon resistor.

5. The temperature sensor arrangement according to claim 4, wherein the polysilicon resistor has a resistance value ranging from 20 kΩ to 25 kΩ.

6. The temperature sensor arrangement according to claim 1, wherein the or at least one of the poly-resistors is a p+ type implanted poly-resistor.

7. The temperature sensor arrangement according to claim 1, wherein the bandgap voltage generator comprises a chopper amplifier.

8. The temperature sensor arrangement according to claim 7, wherein the or each poly-resistor is connected to the output of the chopper amplifier.

9. The temperature sensor arrangement according to claim 7, wherein the bandgap voltage generator further comprises a source follower output stage connected to the output of the chopper amplifier, the or each poly-resistor being connected to the output of the source follower output stage.

10. The temperature sensor arrangement according to claim 1, wherein the arrangement further comprises a reference voltage generator connected to a reference terminal of the differential analog-to-digital converter, and which is configured to provide a reference voltage ($V_{ref}$) to said converter.

11. The temperature sensor arrangement according to claim 1, wherein the differential analog-to-digital converter has a reference terminal connected to a node of said voltage divider network portion, said voltage divider network portion thereby providing a reference voltage ($V_{ref}$) to said converter.

12. The temperature sensor arrangement according to claim 1, wherein the arrangement comprises two semiconductor junctions, two corresponding poly-resistors and means for selectively switching between a connection and a non-connection between each of the semiconductor junctions and the bandgap voltage generator through one of the poly-resistors, a first one of said semiconductor junctions being a bipolar junction transistor device, a second one of said semiconductor junctions being a diode.

13. The temperature sensor arrangement according to claim 12, wherein the arrangement further comprises a chip, the bandgap voltage generator, both of the poly-resistors, the switching means and the bipolar junction transistor device being implanted on said chip, the diode being implanted on another separate chip.

14. The temperature sensor arrangement according to claim 1, wherein the arrangement comprises two poly-resistors to be connected selectively through a respective switch to the semiconductor junction, and connected to the output of the bandgap voltage generator.

* * * * *